United States Patent
Molano et al.

(10) Patent No.: US 12,021,694 B2
(45) Date of Patent: *Jun. 25, 2024

(54) VIRTUALIZED NETWORK FUNCTIONS

(71) Applicant: Hewlett Packard Enterprise Development LP, Houston, TX (US)

(72) Inventors: Luis Gonzalez Molano, Madrid (ES); Pedro Romero Sendino, Madrid (ES); Juan Postlbauer Correas, Madrid (ES); Francisco Javier Ortiz Oliveira, Madrid (ES); Ignacio Aldama Perez, Madrid (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,589

(22) Filed: Jun. 17, 2022

(65) Prior Publication Data

US 2023/0336421 A1 Oct. 19, 2023

Related U.S. Application Data

(63) Continuation of application No. 17/280,566, filed as application No. PCT/US2018/054988 on Oct. 9, 2018, now Pat. No. 11,394,617.

(51) Int. Cl.
*G06F 15/173* (2006.01)
*H04L 41/0813* (2022.01)
(Continued)

(52) U.S. Cl.
CPC ...... *H04L 41/0893* (2013.01); *H04L 41/0813* (2013.01); *H04L 41/0823* (2013.01)

(58) Field of Classification Search
CPC ............. H04L 41/0893; H04L 41/0813; H04L 41/0823
See application file for complete search history.

(56) References Cited

U.S. PATENT DOCUMENTS 9,582,328 B1   2/2017  Tao et al.
11,394,617 B2 *  7/2022  Molano ............... H04L 41/0823
(Continued)

FOREIGN PATENT DOCUMENTS

| CN | 106201466 A | 12/2016 |
|---|---|---|
| WO | 2017/143548 A1 | 8/2017 |
| WO | 2018/034663 A1 | 2/2018 |

OTHER PUBLICATIONS

International Search Report & Written Opinion received in PCT Application No. PCT/US2018/054988, dated May 21, 2019, 08 pages.

(Continued)

*Primary Examiner* — Joseph R Maniwang
(74) *Attorney, Agent, or Firm* — Hewlett Packard Enterprise Patent Department

(57) ABSTRACT

Example implementations relate to generating virtualized network functions by identifying mappable elements and unmappable elements of a virtualized network function template based on a network function virtualization model. The mappable elements may be mapped to the network function virtualization model. The mappable elements may be translated based on the mapping. The unmappable elements are filtered based on a black-white list. The translated virtualized network function definition comprising the translated elements and the filtered elements is generated. The virtualized network function is generated based on the translated virtualized network function definition.

16 Claims, 5 Drawing Sheets

(51) Int. Cl.
*H04L 41/0823* (2022.01)
*H04L 41/0893* (2022.01)

(56) References Cited

U.S. PATENT DOCUMENTS

| | | |
|---|---|---|
| 2015/0082308 A1 | 3/2015 | Kiess et al. |
| 2016/0057234 A1 | 2/2016 | Parikh et al. |
| 2016/0112261 A1 | 4/2016 | Amato |
| 2017/0289060 A1 | 10/2017 | Aftab et al. |
| 2017/0324612 A1 | 11/2017 | Perez et al. |
| 2018/0027006 A1 | 1/2018 | Zimmermann et al. |

OTHER PUBLICATIONS

Jorge Lopez et al., 'Analyzing and Validating Virtual Network Requests', In Proceedings of the 12th International Conference on Software Technologies (ICSOFT 2017), Jul. 2017, pp. 441-446.

Montida Pattaranantakul et al., 'A First Step Towards Security Extension for NFV Orchestrator', SDN-NFV Sec'17, Mar. 24, 2017, pp. 25-30.

Openstack, "Heat Orchestration Template (HOT) Guide," Apr. 20, 2018, 5 Pgs., Retrieved May 15, 2018.

\* cited by examiner

VIRTUALIZED NETWORK FUNCTIONS

CROSS REFERENCE TO RELATED APPLICATIONS

This application is a continuation of, and claims the priority benefit of, U.S. patent application Ser. No. 17/280,566, filed on Mar. 26, 2021, now U.S. Pat. No. 11,394,617, which is a 371 National Stage Entry of PCT/US2018/054988, filed on Oct. 9, 2018, which are incorporated herein by reference in their entirety.

BACKGROUND

Network function virtualization (NFV) is a technique for delivering communication services. More specifically, NFV is the application of virtualization and automation techniques to provide network services in communication service provider networks. In this way, communication service providers can transform their communication networks from dedicated hardware infrastructure to general purpose infrastructures that provide network services using virtualized network functions (VNFs). With network function virtualization, much of the hardware of a communications network can be replaced with software that performs the same functionality. In comparison to communication networks deployed solely with hardware switches, routers, and the like, communication networks that incorporate VNFs may provide greater flexibility, lower cost, and may be able to introduce new network services in less time.

BRIEF DESCRIPTION OF THE DRAWINGS

The present disclosure may be understood from the following detailed description when read with the accompanying Figures. In accordance with the standard practice in the industry, various features are not drawn to scale. In fact, the dimensions of the various features may be arbitrarily increased or reduced for clarity of discussion.

Some examples of the present application are described with respect to the following figures.

DETAILED DESCRIPTION

The European Telcom Standards Institute (ETSI) has defined a model for NFV architecture. The NFV architecture includes a virtualized infrastructure manager (VIM), a virtualized network function manager (VNFM), and a network function virtualization orchestrator (NFVO). The VIM may be responsible for managing the compute, storage, and network resources that are used to create the virtualized network functions. The VNFM may be responsible for the management of individual VNFs. The NFVO may be responsible for combining VNFs and physical network functions (PNFs) to create the network services provided by the NFVI. Physical network functions may be network functions that are implemented using hardware devices.

A VIM, e.g., OpenStack, may use an NFVO called a HEAT orchestrator. In an example implementation, HEAT orchestration templates (HOT files) may be used to define virtualized network functions. The HOT files may be input to the HEAT orchestrator to generate virtualized network functions. However, HOT files have limitations that may result in the generation of virtualized network functions that violate the policies used to govern their standardization, or otherwise negatively impact other VNFs. Accordingly, examples may provide for the translation of HOT files to prevent policy violations, to prevent the malicious use of HOT files, and/or other potentially negative impacts. For example, HOT files may enable the creation and management of various resources available in a VIM installation. Thus, if the HEAT orchestrator accepts a HOT file, the HEAT orchestrator may not have control over the resources created. Misuse (either malicious or by mistake) of this ability may negatively impact other VNFs and virtual machines running on the VIM platform.

Figure 1:
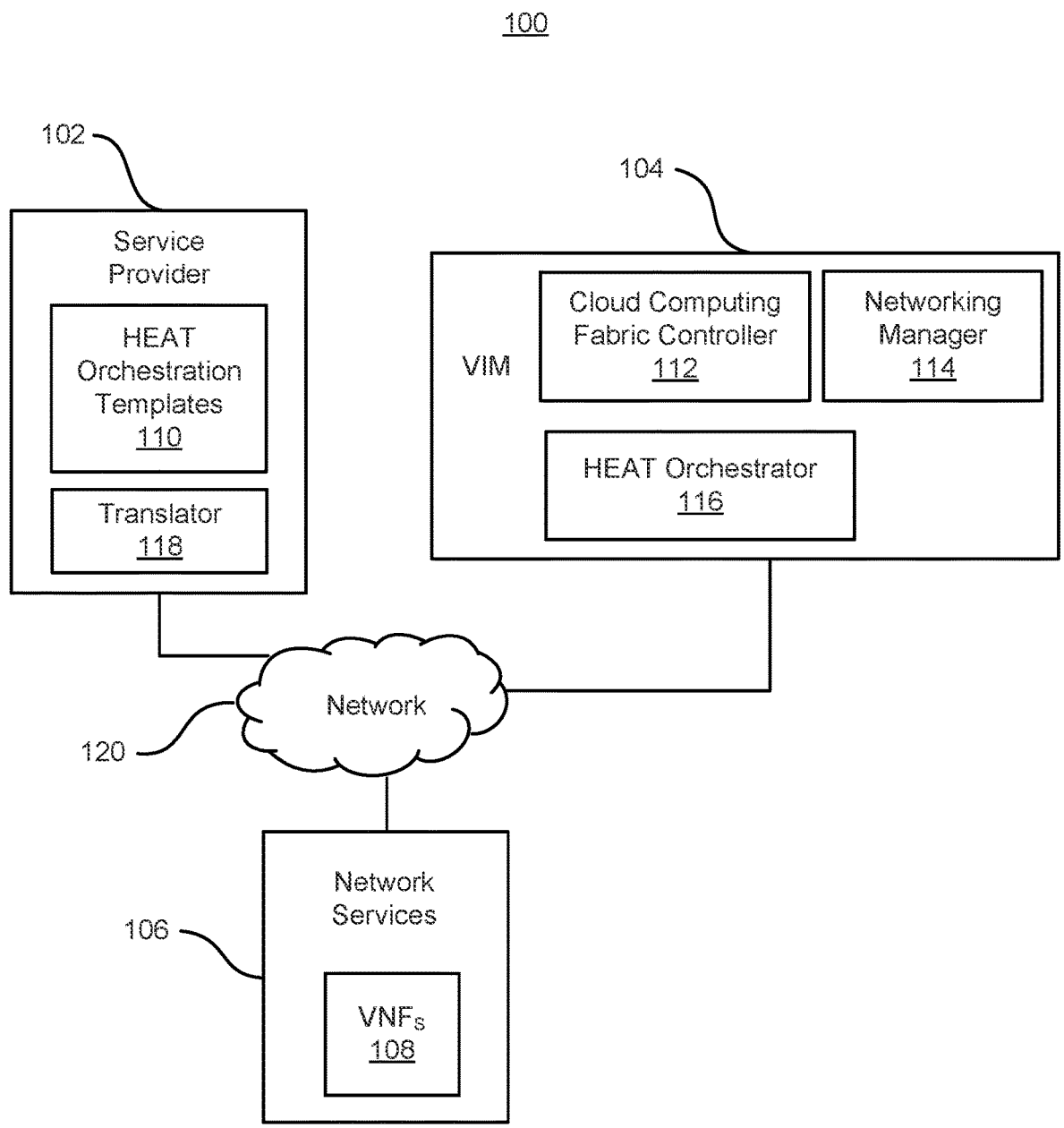
FIG. 1 is an example system for generating virtualized network functions.

FIG. 1 is an example system 100 for generating virtualized network functions. The system 100 may include a service provider 102, a VIM 104, and network services 106, connected over a network 120. The service provider 102 may be a communications service provider that provides network services 106 for its customers. The network services 106 may be communication services, such as email, voice over Internet protocol, printing, file sharing, directory services, video on-demand, video telephony, and the like. In examples, the network services 106 may be composed of virtualized network functions (VNFs) 108. These VNFs, in an example, may be defined by HEAT orchestration templates 110 that may be provided to the service provider 102, e.g. by a customer. The HEAT orchestration templates 110 may define specific resources for building the virtualized network functions 108, such as virtual machines, virtual networks, and the like.

The VIM 104 is a virtualized infrastructure manager (VIM) that may mediate interaction with the physical infrastructure supporting network function virtualization using components, such as a cloud computing fabric controller 112, networking manager 114, and a HEAT orchestrator 116. The cloud computing fabric controller 112, e.g., Nova, may manage pools of computing resources. The networking manager 114, e.g., Neutron may manage networks and internet protocol (IP) addresses. The HEAT orchestrator 116 may coordinate calls to cloud computing fabric controller 112, networking manager 114, and other VIM services. An NFVO may manage the NFV Infrastructure components, such as the virtualized network functions 108. A VNFM may help standardize the functions of virtual networking and increase the interoperability of software-defined networking elements. The HEAT orchestrator 116 may perform these functions based on the definitions provided in HEAT orchestration templates 110.

However, the HEAT orchestration templates 110 may merely define NFVI components, such as virtual machines and virtual networks. In contrast, the virtualized network functions 108 and network services 106 may follow a more complex model, managed by a virtualized network function manager (VNFM) and the NFVO. The model managed by the VNFM and HEAT orchestrator 116 may impose relations and policies on the NFVI that are not defined in the HEAT orchestration templates 110. Accordingly, a translator 118 may merge the information from the HEAT orchestration templates 110 with the model of the VNFM and HEAT orchestrator 116 to generate a translated version of the HEAT orchestration template 110. The translated HEAT orchestration template 110 may be input to the HEAT orchestrator 116 to generate the virtualized network functions 108 or network services 106.

For example, a customer may provide a HEAT orchestration template 110 to the service provider 102 for a network service 106. In an example, the network service 106 may be a video on-demand service. The HEAT orchestration template 110 for the video on-demand service may define multiple virtualized network functions 108. In one example, the virtualized network functions 108 for a video on-demand service may include a virtual network with seventy virtual machines, where each virtual machine may include two central processing units (CPUs), one terabyte-sized disk drives, eight gigabytes of random access memory (RAM), and four interconnected network ports. However, the model for the VNFM and HEAT orchestrator 116 may include a lawful traffic interception for specific virtual machines on the service provider's virtual networks. Lawful traffic interception may refer to when a telecommunications network is under court order to wiretap a specific customer and provide the network communications for that customer to a law enforcement agency. Thus, in examples, the translator 118 may generate a new HEAT orchestration template 110 where the virtual machines specified in the original HEAT orchestration template 110 are modified to include an additional virtual port for the connection to the lawful traffic interception. Accordingly, the translated HEAT orchestration template 110 may be input to the HEAT orchestrator 116 to generate the video on-demand service requested by the customer.

Figure 2:
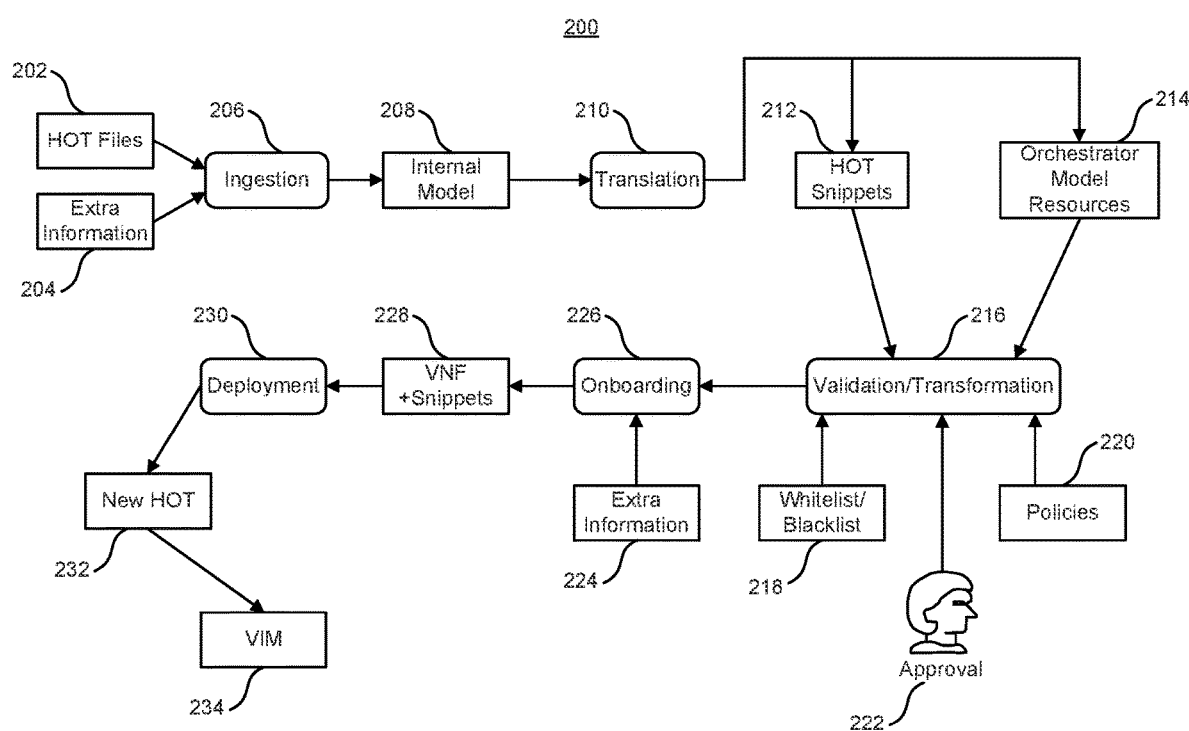
FIG. 2 is a data flow diagram of an example system for generating virtualized network functions.

FIG. 2 is a data flow diagram of an example system 200 for generating virtualized network functions. In examples, HOT files 202 and extra information 204 may be input to an ingestion process 206. The HOT files 202 may be HEAT orchestration templates, such as the HEAT orchestration templates 110, which define virtualized network functions and network services, such as the virtualized network functions 108 and network services 106. The extra information 204 may represent scripts that may be run on virtual machines defined in the HOT files 202. In the ingestion process 206, the HOT files 202 may be decomposed into individual elements, such as virtual machines, virtual networks, ports, and the like to build an internal model 208. The internal model 208 may include the elements that would have been created if the HOT files 202 and extra information had been deployed with an orchestrator, such as the HEAT orchestrator 116. In an alternative example, the ingestion process 206 may accept inputs in different formats than the HOT format of the HOT files 202, and may use existing tools to convert the input to the HOT format before further processing.

The internal model 208 may be input to a translation process 210. During the translation process 210, a translator, such as the translator 118 may map the individual elements and relationships in the internal model 208 to an internal model of the HEAT orchestrator 116 (not shown). The internal model of the HEAT orchestrator 116 may include prescribed parameters for the potential VNFs 108 that may be defined in the HOT files 202. The mapped elements and relationships may be recorded in a set of orchestrator modeled resources 214. The orchestrator modeled resources 214 may apply the prescribed elements from the internal model of the HEAT orchestrator 116 to the individual elements of the HOT files 202. When there is no possible direct mapping between an individual element of the internal model 208 and the internal model of the HEAT orchestrator 116, the individual element is translated into a HOT snippet 212, which is an element that describes the details of the unmapped element and includes pointers to the elements in the other HOT snippets 212 and orchestrator modeled resources 214. In an alternative example, the translation process 210 may accept extra inputs affecting the translation. One example extra input may be a mapping file that guides the separation of the resources inside a complex HOT file 202 into separate VNFs 108.

The HOT snippets 212 and orchestrator modeled resources 214 may be input to a validation and transformation process 216. During the validation and transformation process 216, the HEAT orchestrator 116 may accept or reject the orchestrator modeled resources 214. Alternatively, the HEAT orchestrator 116 may automatically apply changes so that policies 220 are met. The policies 220 may specify conditions for implementing specific types of VNFs 108. For example, one policy 220 may specify that for each virtual machine that handles end user traffic, an extra port may be added that is connected to the network, and dedicated to legal interception.

The HOT snippets 212 may also be rejected or accepted based on whitelists and blacklists 218, or defined transformations. The whitelists may specify virtualized network functions 108 that are permitted by the service provider 102. In contrast, the blacklists may specify virtualized network functions 108 that are prohibited by the service provider 102. Further, where automation is not possible, the HOT snippets 212 may undergo a manual approval process 222, whereby the complete HOT file 202 may be put in quarantine until the manual approval process 222 is complete.

The HOT snippets 212 and orchestrator modeled resources 214 output from the validation and transformation process 216 may be input to an onboarding process 226. The onboarding process 226 may involve the creation of the VNFs 108 and network services 106 as defined in the HOT snippets 212 and orchestrator modeled resources 214. During the onboarding process 226, the HOT snippets 212 and orchestrator modeled resources 214 are updated with extra information 224. The extra information 224 is information that is supplemental to the NFVI resources defined in the HOT snippets and orchestrator modeled resources 214, and further defines the VNFs 108 and network services 106. This extra information may include element manager scripts, forwarding graphs, and other resources specified by the service provider 102 that may not have been considered by the customer. The complete virtualized network functions 108 and network services 106 modeled in this way may retain the HOT snippets 212 for those features not included in the internal model of the HEAT orchestrator 116 and accepted (either automatically or through the manual approval process 222). The onboarding process 226 generates VNFs and HOT snippets 228, which are input to the deployment process 230.

During the deployment process 230, the VNFs and HOT snippets 228 may be reviewed for any potential warnings or confirmations. If the VNFs and HOT snippets 228 contain HOT snippets that are blacklisted, a warning may be provided for, or a confirmation may be requested from the service provider 102 before deploying the VNFs 108. If the VNFs and HOT snippets 228 do not include any HOT snippets the deployment process 230 proceeds as prescribed by the HEAT orchestrator 116. If there are HOT snippets 212, the HEAT orchestrator may build a new HOT file 232 from the artifacts in the internal model of the HEAT orchestrator 116 and merges these artifacts with the HOT snippets 212. The HEAT orchestrator 116 of the VIM 234 may then deploy the VNFs 108 and network services 106 accordingly.

Alternatively, even if the VNFs and snippets 228 include HOT snippets 212, the regular mechanism of the HEAT orchestrator 116 may be used. The HEAT orchestrator 116 may then perform a discovery and reconciliation step to obtain the values of the created VNFs 108 and network service 106. Additionally, a HEAT orchestration template 110 containing only the HOT snippets 212 may be deployed via the HEAT orchestrator 116.

In another example, the validation and transformation process 216 may mark HOT snippets 212 as quarantined. Thus, in the deployment process 230, the quarantined HOT snippets may be deployed to a different virtualized infrastructure manager so the VNF 108 defined by the quarantined HOT snippet 212 may be monitored for verification. The verification may involve ensuring that the quarantined HOT snippet does not violate any policies 220, for example.

Advantageously, merging the information from HEAT orchestration templates 110 with the internal model of the NFVO allows for the instantiation of other VIMs that do not use the HEAT orchestrator 116. Further, elements that are described repeatedly in multiple HEAT orchestration templates 110, such as flavors, can be converted into common shared resources based on specified policies 220 and extra information 224. A flavor may define the compute, memory, and storage capacity of a virtual server. Additionally, this merging enables the service provider to blacklist specific HEAT features, for example, due to security regulations. Also, merging in this way makes it possible to enforce and implement policies. For example, the service provider 102 may implement a policy that provides each virtual machine with at least one connection to a backup network. In another example, a policy for restrictions on allowed network address masks may be enforced to alleviate issues with IPV4 address space conservation.

Figure 3:
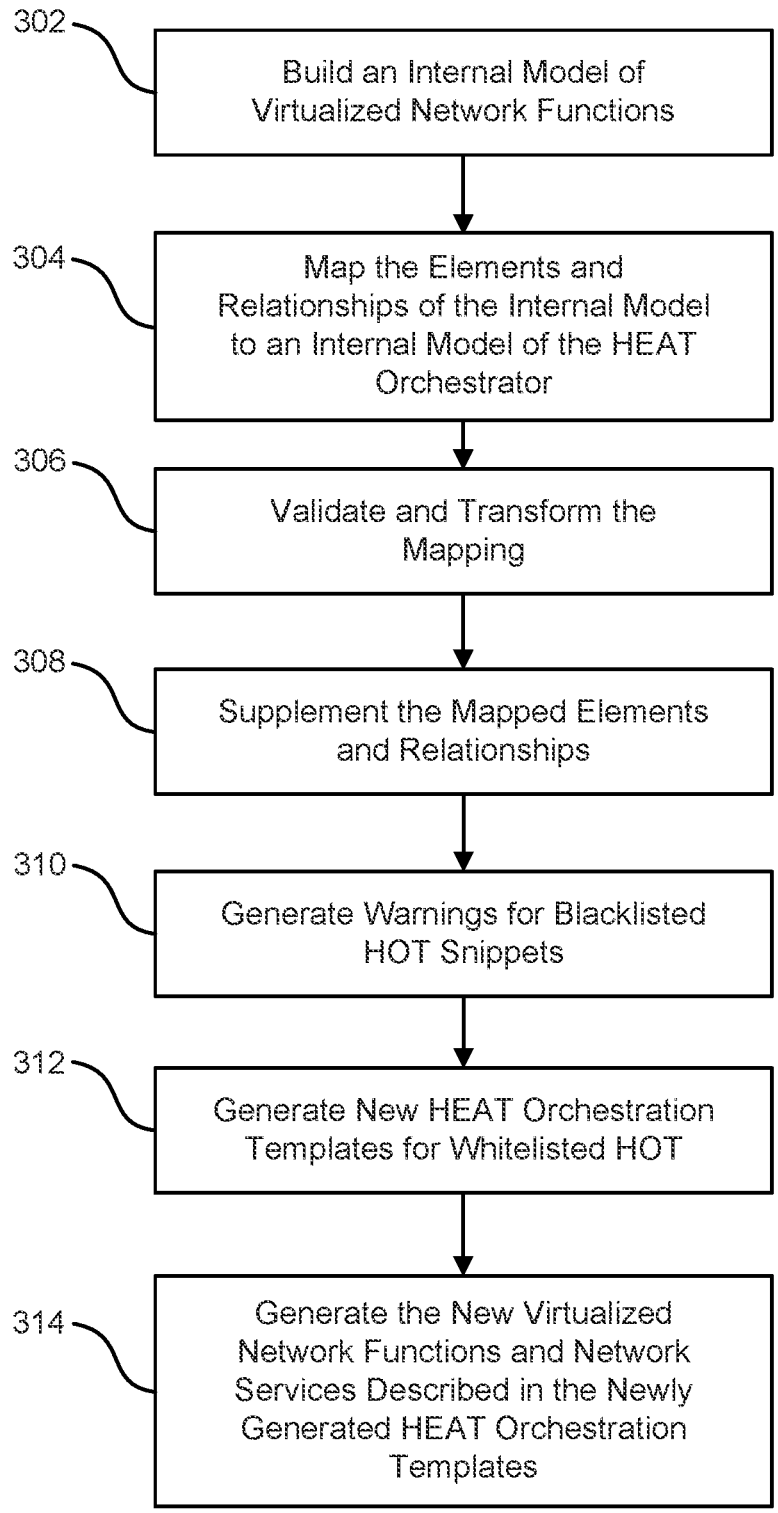
FIG. 3 is an example method for generating virtualized network functions.

FIG. 3 is an example method 300 for generating virtualized network functions. The method 300 may be performed by an NFVO, such as the HEAT orchestrator 116, and a translator, such as the translator 118. At block 302, the translator 118 may build an internal model of virtualized network functions 108 based on the HEAT orchestration templates 110.

At block 304, the translator 118 may map the elements and relationships of the internal model built by the translator 118 to an internal model of the HEAT orchestrator 116. The elements and relationships of the internal model built by the translator 118 that cannot be mapped to the internal model of the HEAT orchestrator 116 may be translated to HOT snippets, such as the HOT snippets 212. The HOT snippets 212 may describe details of the elements and pointers to related elements.

At block 306, the HEAT orchestrator 116 may validate and transform the mapping. In other words, the HEAT orchestrator 116 may accept, reject, or automatically apply changes to the elements and relationships mapped to the internal model of the HEAT orchestrator 116. In this way, policies may be enforced. For example, a policy related to licensing could state, "Organization X cannot deploy more than Y simultaneous virtual machines using image Z." In examples, such a policy may only be enforced by looking at the to-be-deployed file and all the previously deployed files. Additionally, the HEAT orchestrator 116 may accept or reject the HOT snippets 212 based on whitelists and blacklists, such as whitelists and blacklists 218. Alternatively, the HOT snippets 212 may be quarantined before a manual approval process is implemented.

At block 308, the HEAT orchestrator 116 may supplement the mapped elements and relationships with extra information, such as element manager scripts, forwarding graphs, and the like. At block 310, the HEAT orchestrator 116 may generate warnings for any HOT snippets 212 that are blacklisted. At block 312, for any HOT snippets 212 that are whitelisted, the HEAT orchestrator 116 may generate a new HOT file 232 that merge the whitelisted HOT snippets with the elements mapped to the internal models.

At block 314, the HEAT orchestrator 116 may generate the new virtualized network functions 108 and network services 106 described in the newly generated HEAT orchestration templates 110.

It is to be understood that the process flow diagram of FIG. 3 is not intended to indicate that the method 300 is to include all of the blocks shown in FIG. 3 in every case. Further, any number of additional blocks can be included within the method 300, depending on the details of the specific implementation. In addition, it is to be understood that the process flow diagram of FIG. 3 is not intended to indicate that the method 300 is only to proceed in the order indicated by the blocks shown in FIG. 3 in every case. For example, block 304 can be rearranged to occur before block 302.

Figure 4:
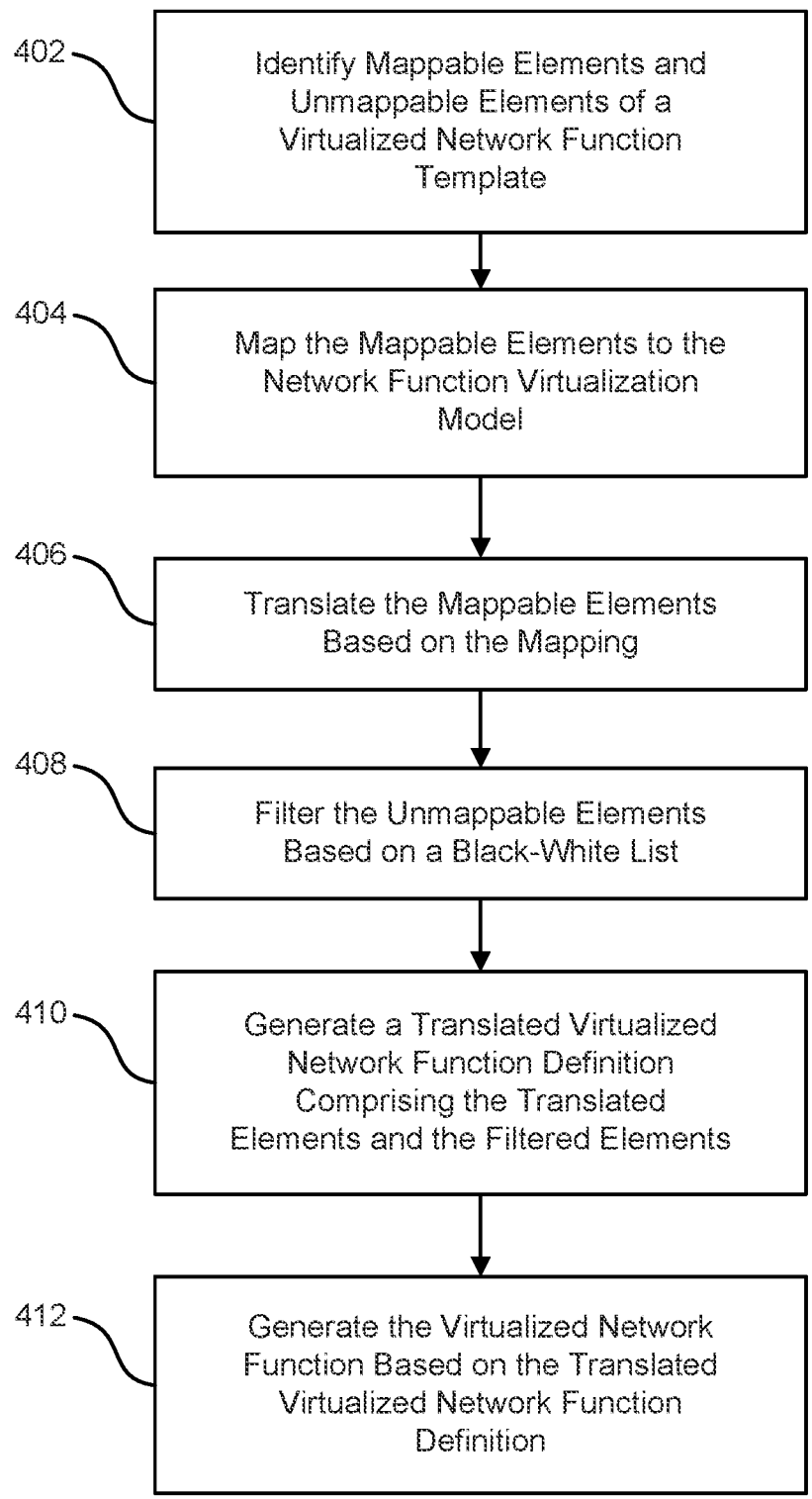
FIG. 4 is an example method for generating virtualized network functions.

FIG. 4 is an example method 400 for generating virtualized network functions. The method 400 may be performed by an NFVO, such as the HEAT orchestrator 116, and a translator, such as the translator 118. At block 402, the HEAT orchestrator 116 may identify mappable elements and unmappable elements of a virtualized network function template based on a network function virtualization model. The virtualized network function template may include, for example, HEAT orchestration templates 110.

At block 404, the HEAT orchestrator 116 may map the mappable elements to the network function virtualization model. At block 406, the translator 118 may translate the mappable elements based on the mapping to generate one or more translated elements. As stated previously, the translator 118 may map the individual elements and relationships in the internal model 208 to an internal model of the HEAT orchestrator 116. The mapped elements and relationships may be recorded in the orchestrator modeled resources 214, which may apply prescribed elements from the internal model 208 to the individual elements of the HOT files 202. Additionally, the translator 118 generates the HOT snippets 212 when there is no direct mapping between an element of the internal model 208 and the internal model of the HEAT orchestrator 116.

At block 408, the translator 118 may filter the unmappable elements based on a black-white list to generate one or more filtered elements. For example, the translator 118 may use a filter such as the whitelist-blacklist 218.

At block 410, the HEAT orchestrator 116 may generate a translated virtualized network function definition comprising the translated elements and the filtered elements. The translated virtualized network function definition may include for example, the new HOT file 232. At block 412, the HEAT orchestrator 116 may generate the virtualized network function based on the translated virtualized network function definition.

It is to be understood that the process flow diagram of FIG. 4 is not intended to indicate that the method 400 is to include all of the blocks shown in FIG. 4 in every case. Further, any number of additional blocks can be included within the method 400, depending on the details of the specific implementation. In addition, it is to be understood that the process flow diagram of FIG. 4 is not intended to indicate that the method 400 is only to proceed in the order indicated by the blocks shown in FIG. 4 in every case. For example, block 404 can be rearranged to occur before block 402.

Figure 5:
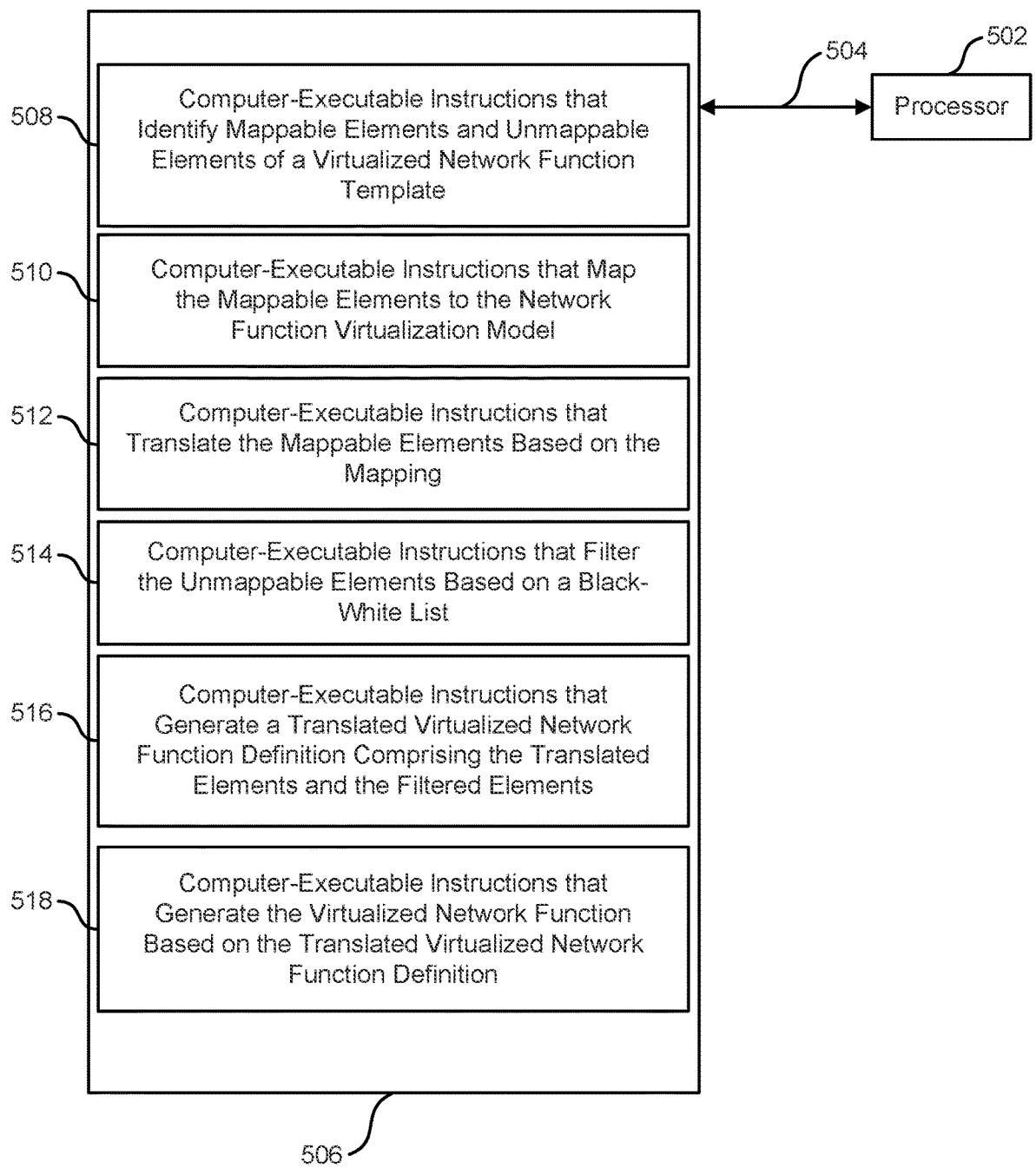
FIG. 5 is an example system having a tangible, non-transitory computer-readable medium that stores code for generating a virtualized network function.

FIG. 5 is an example system 500 having a tangible, non-transitory computer-readable medium 506 that stores code for generating a virtualized network function. The tangible, non-transitory computer-readable medium is generally referred to by the reference number 506. The tangible, non-transitory computer-readable medium 506 may correspond to any typical computer memory that stores computer-implemented instructions, such as programming code or the like. For example, the tangible, non-transitory computer-readable medium 506 may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The tangible, non-transitory computer-readable medium 506 can be accessed by a processor 502 over a computer bus 504. A region 508 of the tangible, non-transitory computer-readable medium stores computer-executable instructions that identify mappable elements and unmappable elements of a virtualized network function template based on a network function virtualization model. A region 510 of the tangible, non-transitory computer-readable medium stores computer-executable instructions that map the mappable elements to the network function virtualization model. A region 512 of the tangible, non-transitory computer-readable medium stores computer-executable instructions that translate the mappable elements based on the mapping to generate one or more translated elements. A region 514 of the tangible, non-transitory computer-readable medium stores computer-executable instructions that filter the unmappable elements based on a black-white list to generate one or more filtered elements. A region 516 of the tangible, non-transitory computer-readable medium stores computer-executable instructions that generate a translated virtualized network function definition comprising the translated elements and the filtered elements. A region 518 of the tangible, non-transitory computer-readable medium stores computer-executable instructions that generate the virtualized network function based on the translated virtualized network function definition.

Although shown as contiguous blocks, the software components can be stored in any order or configuration. For example, if the tangible, non-transitory computer-readable medium 506 is a hard drive, the software components can be stored in non-contiguous, or even overlapping, sectors.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for generating a virtualized network function, comprising:
    identifying one or more mappable elements and one or more unmappable elements of a virtualized network function template based on a network function virtualization model;
    mapping the one or more mappable elements to the network function virtualization model;
    translating the one or more mappable elements based on the mapping to generate one or more translated elements;
    generating a translated virtualized network function definition comprising the one or more translated elements; and
    generating the virtualized network function based on the translated virtualized network function definition.

2. The method of claim 1, comprising generating a plurality of virtualized network functions based on the translated virtualized network function definition.

3. The method of claim 2, comprising generating a network service that comprises the plurality of virtualized network functions.

4. The method of claim 1, wherein the virtualized network function template comprises a HEAT orchestration template.

5. The method of claim 1, comprising generating a HEAT orchestration template based on the virtualized network function template, wherein the mappable elements are mapped based on the HEAT orchestration template.

6. The method of claim 1, wherein the virtualized network function is generated by a HEAT orchestrator.

7. A system, comprising:
    a processor; and
    a memory device comprising computer-implemented code to:
        identify one or more mappable elements and one or more unmappable elements of a virtualized network function template based on a network function virtualization model;
        map the one or more mappable elements to the network function virtualization model;
        translate the one or more mappable elements based on the mapping to generate one or more translated elements;
        generate a translated virtualized network function definition comprising the one or more translated elements; and
        generate the virtualized network function based on the translated virtualized network function definition.

8. The system of claim 7, wherein the memory device comprises computer-implemented code to generate a plurality of virtualized network functions based on the translated virtualized network function definition.

9. The system of claim 8, wherein the memory device comprises computer-implemented code to generate a network service that comprises the plurality of virtualized network functions.

10. The system of claim 7, wherein the virtualized network function template comprises a HEAT orchestration template.

11. The system of claim 7, wherein the memory device comprises computer-implemented code to generate a HEAT orchestration template based on the virtualized network function template, wherein the mappable elements are mapped based on the HEAT orchestration template.

12. The system of claim 7, wherein the virtualized network function is generated by a HEAT orchestrator.

13. A non-transitory, computer-readable medium storing computer-executable instructions, which when executed, cause a computer to:
    identify one or more mappable elements and one or more unmappable elements of a virtualized network function template based on a network function virtualization model;
    map the one or more mappable elements to the network function virtualization model;
    translate the one or more mappable elements based on the mapping to generate one or more translated elements;
    generate a translated virtualized network function definition comprising the one or more translated elements; and
    generate the virtualized network function based on the translated virtualized network function definition.

14. The non-transitory, computer-readable medium of claim 13, wherein the computer-executable instructions, when executed, cause the computer to generate a plurality of virtualized network functions based on the translated virtualized network function definition.

15. The non-transitory, computer-readable medium of claim 13, wherein the computer-executable instructions, when executed, cause the computer to generate a network service that comprises the plurality of virtualized network functions.

16. The non-transitory, computer-readable medium of claim 15 wherein the virtualized network function template comprises a HEAT orchestration template.

* * * * *